United States Patent [19]

Martini

[11] 3,810,484
[45] May 14, 1974

[54] COOLING WATER VALVE
[75] Inventor: Leonard J. Martini, Monrovia, Calif.
[73] Assignee: The United States of America as represented by the Secretary of the Navy, Washington, D.C.
[22] Filed: Jan. 30, 1973
[21] Appl. No.: 327,883

[52] U.S. Cl. .................. 137/70, 251/63, 251/63.5
[51] Int. Cl. .. F16k 13/04, F16k 17/14, F16k 17/40
[58] Field of Search .......... 137/68, 69, 70, 71, 536; 251/63, 63.5, 63.6, 65, 66

[56] References Cited
UNITED STATES PATENTS

| | | | |
|---|---|---|---|
| 2,522,145 | 9/1950 | Thompson | 137/536 |
| 2,928,646 | 3/1960 | Ashbrook | 251/63 |
| 2,966,163 | 12/1960 | Nylin | 137/68 |
| 2,997,051 | 8/1961 | Williams | 137/68 |
| 3,122,154 | 2/1964 | Siebel et al. | 137/58 |
| 3,512,550 | 5/1970 | Ammann | 251/63 |

FOREIGN PATENTS OR APPLICATIONS

| | | | |
|---|---|---|---|
| 282,823 | 10/1952 | Switzerland | 251/63 |

Primary Examiner—Alan Cohan
Assistant Examiner—George L. Walton
Attorney, Agent, or Firm—Richard S. Sciascia; Ervin F. Johnston

[57] ABSTRACT

A water valve assembly which includes a valve body having a central passageway which has a water receiving portion and a counterbored portion, and a lateral water inlet port which opens into the water portion of the passageway. A piston and rod are provided with the piston sealably disposed within the counterbore portion of the passageway and the rod sealably disposed within the water portion of the passageway so that longitudinal movement of the piston in the counterbore causes the rod to open and close the water portion of the passageway to the inlet port. Means are provided for biasing the piston and rod to close the water portion of the passageway, and means are provided for applying pressurized fluid to the backside of the piston for driving the piston and rod to open the water portion of the passageway. Once the passageway is opened it may be maintained in an opened condition by the force of the water pressure on the end of the piston rod against the biasing means.

3 Claims, 3 Drawing Figures

PATENTED MAY 14 1974

3,810,484

COOLING WATER VALVE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a valve assembly which may be utilized for opening cooling water passages within a torpedo or similar device to ambient ocean water at a desired time.

In some applications of navy torpedoes the torpedo remains submerged in a salt water environment for a period of time prior to launch. The cooling water passages of present torpedoes fill with the salt water when placed in a submerged condition which results in internal corrosion. Further, the seals between the water passageway and the combustion chamber and gas inlet ports in the torpedo limit the torpedo to shallow depths. Any leakage within the combustion chamber could cause further corrosion within this area and prevent start-up of the torpedo motor. Accordingly, there existed a strong need for a cooling water valve for torpedoes which were stored in a submerged condition. It was desirable that this valve be depth insensitive, be compact, and be reusable for practice torpedoes.

SUMMARY OF THE INVENTION

The present invention is a water valve assembly which provides a solution to the aforementioned problems associated with prior art navy torpedoes. The valve assembly may include a valve body which has a central passageway which has a water receiving portion and a counterbored portion. The valve body also has a lateral water inlet port which opens into the water receiving portion of the passageway. A piston and rod are provided with the piston sealably disposed within the counterbore portion and the rod sealably disposed within the water receiving portion of the passageway so that longitudinal movement of the piston in the counterbore causes the rod to open and close the water receiving portion of the passageway to said inlet port. Means are provided for biasing the piston and rod to close the water portion of the passageway, and means are provided for applying pressurized fluid to the backside of the piston for driving the piston and rod to open the water portion of the passageway. The biasing means is quite unique and results in compactness of the valve, cushioning impact opening of the valve so as to make it reusable, and making reaction opening time of the valve easily changeable. This may be accomplished by utilizing a compression spring as a biasing force internally disposed within the piston and rod.

OBJECTS OF THE INVENTION

An object of the present invention is to overcome the aforementioned problems associated with prior art torpedoes which are to be stored in a submerged condition.

Another object is to provide a quick reaction fluid valve which is reusable.

A further object is to provide a depth insensitive cooling water valve for a torpedo wherein the valve is highly compact, reusable, and highly reliable in operation.

Other objects, advantages and novel features of the invention will become apparent from the following detailed description of the invention, when considered in conjunction with the accompanying drawings wherein:

DESCRIPTION OF THE PREFERRED EMBODIMENT

Figure 1:
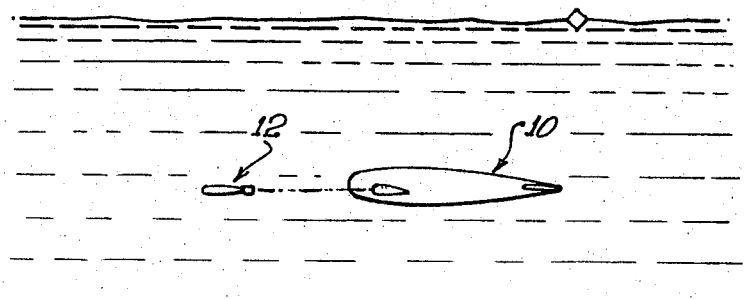
FIG. 1 is an ocean elevation view illustrating a submarine firing a torpedo.

Referring now to the drawing wherein like reference numerals designate like or similar parts throughout the several views there is illustrated in FIG. 1 a submarine 10 which has just launched a torpedo 12. In certain torpedo applications the torpedo 12 is stored in a submerged condition within one of the torpedo tubes of the submarine 10 for an indefinite period of time prior to launch. It is necessary during this storage period that the torpedo 12 be protected from the salt water environment. Should salt water remain within the cooling water passages of the torpedo, these passages will corrode, and at depths other than shallow water depths the seals to vital internal components may burst and allow sea water penetration to destroy the torpedo. A cooling water valve assembly 14, as illustrated in FIGS. 2 and 3, is provided for overcoming these problems.

Figure 2:
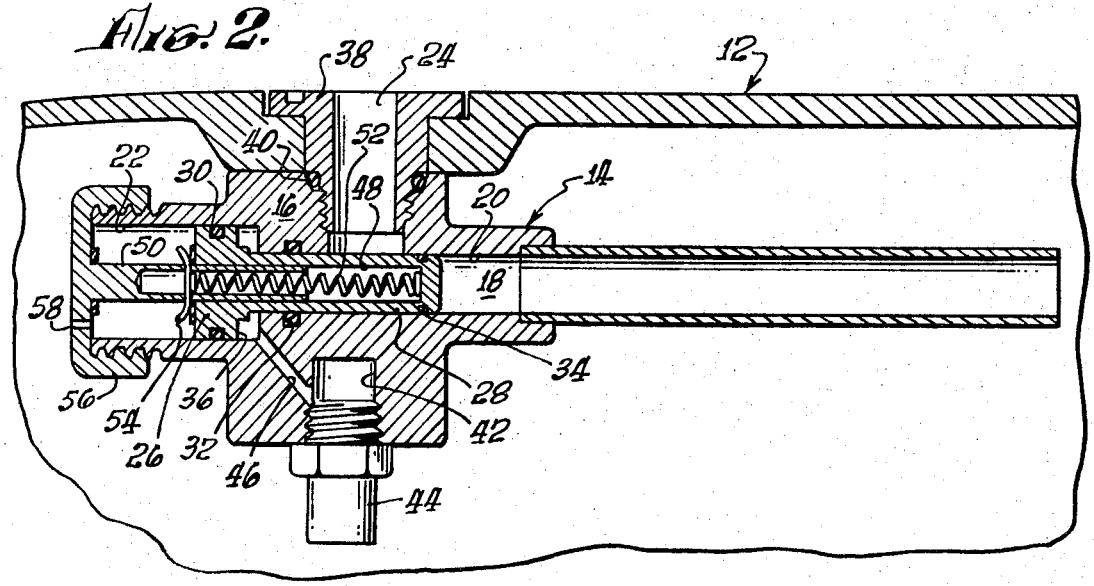
FIG. 2 is a longitudinal cross-sectional view of the valve assembly in a closed condition.
Figure 3:
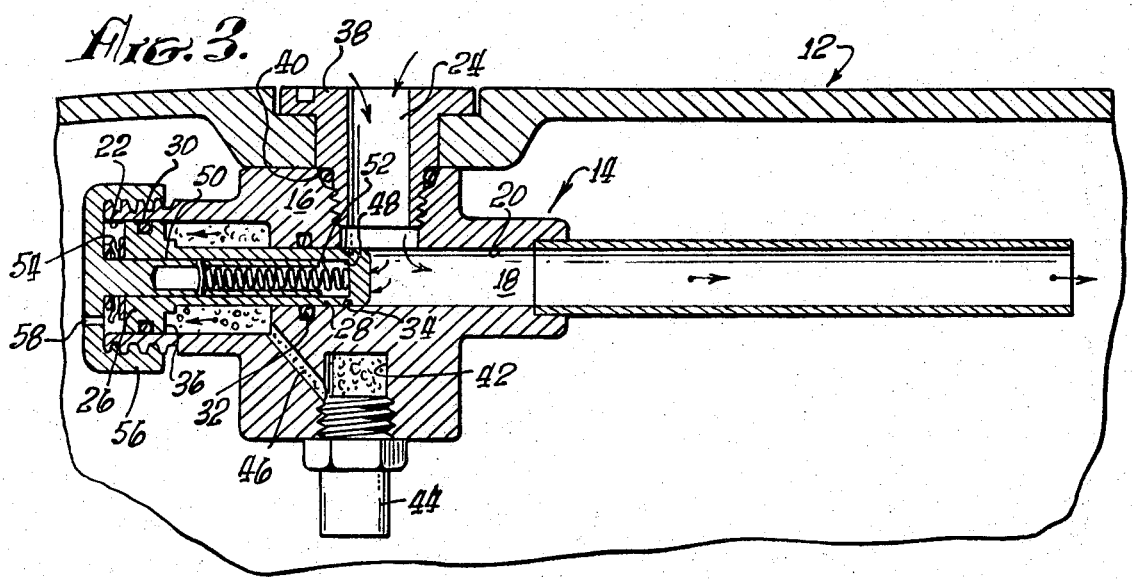
FIG. 3 is a longitudinal cross-sectional view of the valve assembly in an open condition.

As illustrated in FIG. 2, the valve assembly 14 may include a valve body 16 which has a central passageway 18 which has a water receiving portion 20 and a counterbored portion 22. The valve body 16 also has a lateral water inlet port 24 which opens into the water portion 20 of the passageway 18. A piston 26 and rod 28 are provided with the piston 26 sealably disposed within the counterbore 22 and the rod 28 being sealably disposed within the water passageway 20. With this arrangement, movement of the piston 26 within the counterbore 22 causes the rod 28 to open and close the water passageway 20 to the inlet port 24. The piston 26 may be sealed within the counterbore 22 by an O ring 30 and the rod 28 may be sealed to the passageway 20 by O rings 32 and 34.

Means may be provided for biasing the piston 26 and rod 28 to close the water passageway 20, the closed position being illustrated in FIG. 2. Further, means may be provided for applying pressurized fluid to the backside 36 of the piston so as to drive the piston 26 and the rod 28 to open the water passageway 20, as illustrated in FIG. 3. The biasing means and pressurized fluid means will be described in detail hereinafter. The valve assembly 14 may be retained to the interior of the torpedo hull 12 by a fitting 38. The fitting 38 may be threaded within the valve opening 24 and may be sealed therein by an O ring 40.

The pressurized fluid applying means, referred to hereinabove, may include the valve body 16 having a gas chamber 42 which is capable of receiving an explosive squib 44. A squib 44 may be threaded within the chamber 42, and upon activation will generate high pressure gas within the chamber. The valve body 16 may further include a gas passageway 46 which extends between the gas chamber 42 and the counterbore 22 at the bottom side 36 of the piston 26. Upon actuation of the squib 44, a great deal of force is applied to the bottom 36 of the piston for quickly moving the piston and rod to open the passageway 20 to the inlet port 24.

The biasing means, referred to hereinabove, may include the piston 26 and rod 28 having a central bore 48 which extends substantially the full length of both the piston and rod. The valve body 16 may be provided with a central tube 50 which is slidably disposed within the bore 48. A compression spring 52 may be disposed within the tube 50 and the bore 48 for cushioning the impact on the piston 26 when it is driven by the force of the pressurized gas from the explosive squib 44. A shear wire 54 may extend through the tube 50 at one end of the spring 52 adjacent the top of the piston 26 for retaining the rod 28 in the closed condition, as illustrated in FIG. 2. This wire should be of such a strength so as to be easily broken by the force of the pressurized gas, but yet strong enough to retain the closed condition until operation of the torpedo is desired.

It should be noted that the aforementioned biasing means fulfills a multiple function role. The internal placement of the spring 52 provides an extremely compact valve assembly. The tubular support 50 for the piston 26 and rod 28 enables the piston 26 to be extremely short and yet prevents any cocked piston condition especially when the rod 28 is supported only at one end during the opening phase. The cushioning effect of the spring enables the valve assembly to be reused many times simply by replacing the seals and the explosive squib 44. Further, the strength of the spring can be varied to obtain different reaction times for opening the valve.

The tube 50 may be centrally connected to a cap 56 which is threaded to the end of the valve body 16. This cap may be provided with an aperture 58 for regulating the rate of expulsion of gas from the space at the top of the piston 26 which in turn will regulate the reaction time for opening the valve.

OPERATION OF THE INVENTION

When the torpedo 12 is stored in a torpedo tube in a submerged condition within the submarine 10 the valve is in a closed position as illustrated in FIG. 2. This prevents ambient sea water from entering the cooling water spaces within the torpedo and obviates any corrosion problem therein. Upon actuation of the torpedo 12, the explosive squib 44 may be fired which causes pressurized gas to be applied to the bottom 36 of the piston 26. This moves the piston 26 and the rod 28 quickly to the left causing the water passage 20 to be opened to sea water through the inlet port 24, as illustrated in FIG. 3. This cooling water then passes to a pump (not shown) which pumps the water through the cooling passages within the torpedo. The high force applied to the piston 26 shears the wire 54 and the spring 52 cushions the impact of the piston 26 after the valve assembly has been opened. The arrangement of the spring 52 makes the valve assembly extremely compact and yet reusable many times when practice torpedoes are employed.

Obviously many modifications and variations of the present invention are possible in the light of the above teachings. It is therefore to be understood that within the scope of the appended claims the invention may be practiced otherwise than as specifically described.

I claim:
1. A water valve assembly comprising:
   a valve body having a central passageway which has a water receiving portion and a counterbored portion;
   said valve body also having a lateral water inlet port opening into the water portion of the passageway;

a piston and rod;
   the piston being sealably disposed within the counterbore portion and the rod being sealably disposed within the water portion so that longitudinal movement of the piston in the counterbore causes the rod to open and close the water portion of the passageway to said inlet port;
   means for biasing the piston and rod to close said water portion of the passageway;
   the biasing means comprising:
       said piston and rod having a central bore;
       the valve body having a central tube slidably disposed within the bore of the piston and rod; and a compression spring disposed within the tube and the bore of the rod for cushioning the piston when driven by the pressurized fluid;
   means for applying pressurized fluid to the backside of the piston for driving the piston and rod to open the water portion of the passageway;
   the pressurized fluid applying means comprising:
       said valve body having a gas chamber which is capable of receiving an explosive squib for the generation of high pressure gas within the chamber; and
       said valve body having a gas receiving passageway extending between the gas chamber and counterbore on the bottom side of the piston; and
   a shear wire extending through the central tube across the top of the piston for retaining the rod in a closed position across the water inlet port until the wire is broken by the force of the pressurized fluid on the backside of the piston;
   whereby, upon opening of the water portion of the passageway, water can flow and the piston or rod can be kept open against the biasing force by water pressure on the end of the piston rod.

2. A valve assembly as claimed in claim 1 including;
   said valve body including a threaded cap at its counterbored end; and
   said central tube being connected to the threaded cap.

3. A valve assembly as claimed in claim 2 including:
   the pressurized fluid applying means comprising:
       said valve body having a gas chamber which is capable of receiving an explosive squib for the generation of high pressure gas within the chamber; and said valve body having a gas receiving passageway extending between the gas chamber and counterbore on the bottom side of the pistion.

* * * * *